United States Patent [19]

Itai et al.

[11] 3,998,710
[45] Dec. 21, 1976

[54] PROCESS FOR ELECTROLYTICALLY PURIFYING A PHOTOGRAPHIC WASTE SOLUTION

[75] Inventors: Reiichi Itai; Katsuyuki Murakami, both of Maebashi, Japan

[73] Assignee: The Japan Carlit Co., Ltd., Tokyo, Japan

[22] Filed: Mar. 8, 1976

[21] Appl. No.: 665,057

[30] Foreign Application Priority Data

Mar. 11, 1975  Japan .............................. 50-29318

[52] U.S. Cl. ................................ 204/130; 204/149
[51] Int. Cl.² ............................................ C02B 1/82
[58] Field of Search ............................ 204/130, 149

[56] References Cited

UNITED STATES PATENTS

| | | | |
|---|---|---|---|
| 1,876,830 | 9/1932 | Balassa | 204/130 |
| 1,905,467 | 4/1933 | Hickman | 204/130 |
| 1,930,143 | 10/1933 | Hickman et al. | 204/130 |
| 2,073,621 | 3/1937 | Blaney | 204/130 |
| 2,073,664 | 3/1937 | Weisberg et al. | 204/130 |

Primary Examiner—R. L. Andrews
Attorney, Agent, or Firm—Flynn & Frishauf

[57] ABSTRACT

After silver has been recovered from a photographic waste solution, said waste solution is electrolytically purified by adding chloride ion and carbonate ion or chloride ion, carbonate ion and iodide or iodate ion to said waste solution under limited pH, temperature, anode current density and current concentration conditions.

4 Claims, 3 Drawing Figures

PROCESS FOR ELECTROLYTICALLY PURIFYING A PHOTOGRAPHIC WASTE SOLUTION

BACKGROUND OF THE INVENTION

1. Field of the Invention

The present invention relates to a process for electrolytically purifying a photographic waste solution containing developer and fixing waste solutions after silver has been recovered from said waste solution, thereby degrading and removing from said waste solution those components having high COD (chemical oxygen demand) concentrations.

2. Description of the Prior Art

Black-and-white and color photography has gained wide acceptance and plates for photoprinting and X-ray photographs are being manufactured in large numbers, so large quantities of photographic waste solutions must be discharged. It is ecologically very objectionable to dump such waste solutions into the waterways without appropriate treatment, for they contain as much as tens of thousands ppm of components which are high in COD and pollute the water courses into which they are dumped. The regulations on environmental pollution are becoming stricter and are being enforced more rigorously, so the removal of such pollutants from photographic waste solutions has become a matter requiring immediate attention.

There are two conventional techniques for purifying a photographic waste solution after silver has been recovered from said waste solution: one is thermal oxidative decomposition using hypochlorite as oxidizing agent; the other is an activate sludge process. The disadvantages of the thermal oxidative decomposition process are that it requires a long heating time, involves complicated control procedures for the agents used and, lastly, the agents required are expensive. The disadvantages of the activated sludge process are that large-scale equipment, including a pool or tank for the waste solution, is required and the processing time is long. Further, neither method is successful in removing objectionable components having high COD values, so secondary treatments are necessary. These additional steps increase the operating costs. A recent method involves adding salt (sodium chloride) to waste water including organic substances and effecting electrolysis to remove those components having high COD values, but this method has not proven practical because it does not remove enough of such objectionable components. In short, none of the prior art inventions succeeds in removing almost all of the components having high concentrations of COD by electrolytic oxidation alone.

SUMMARY OF THE INVENTION

The primary object of this invention is to provide a process for economically and efficiently removing all or almost all of the high COD components from a photographic waste solution. The waste solution so treated can be discharged into water courses without causing ecological damage.

Another object of this invention is to provide a process for rapidly, efficiently and adequately purifying photographic waste solution after silver has been recovered therefrom by effecting electrolytic oxidation under suitable conditions using said waste solution as electrolyte.

A further object of this invention is to provide a process for electrolytically purifying a photographic waste solution from which the silver has been recovered which does not require large-scale or intricate equipment or complicated processing techniques.

Other objects and advantages of this invention will be clearly understood from the following description.

DESCRIPTION OF THE PREFERRED EMBODIMENT

The purification process of the present invention comprises adding to the photographic waste solution from which silver has been recovered either those precursors which impart chloride and carbonate ions or those which impart chloride, carbonate and iodide or iodate ions, and subjecting such waste solution to non-diaphragm electrolytic oxidation at a pH of 4 to 10, a temperature of 10° to 100° C, an anode current density of 2 to 40 amperes per square decimeter ($A/dm^2$) and a current concentration of 3 to 50 amperes per liter ($A/l$). According to this process, the components having high COD values are reduced to almost zero, and the waste solution thus treated can be discharged into the waterways without secondary treatment.

The photographic waste solution to be purified in the process of this invention contains developer and fixing waste solutions. The developer waste solution contains metol, hydroquinone, phenidone, etc. as general developing agents, and derivatives of p-phenylene diamine as color developing agents; derivatives of phenol or naphthol, sulfites; alkalis; formaldehyde, hydroxyl amine salts and the like as other additives. The COD concentrations of the developer waste solutions range from tens of thousands of ppm to hundred of thousands ppm. Further, when said waste solutions contain a thiosulfate as a general fixing agent, sulfites, acetic acid, boric acid, alum, etc. as other additives, the COD concentrations of the fixing waste solutions may be as large as tens of thousands of ppm. The purification process of this invention is applicable to a wide variety of photographic waste solutions containing a developer and 10% (volume) or more of a fixing waste solution for a color photograph, a plate making-printing and an X-ray photograph depending upon the proportions of their components. And also, waste solutions similar to the above in other fields are purified by the process of this invention.

Figure 1:
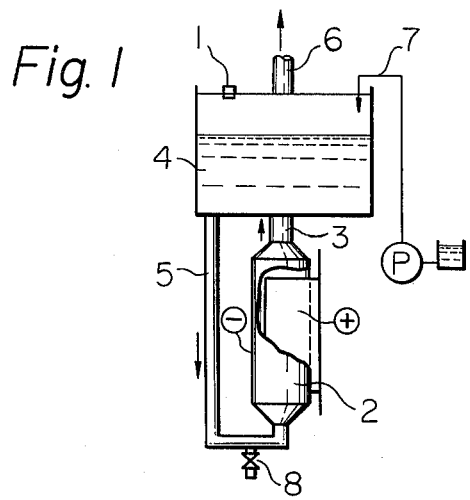
FIG. 1 is an outline of the electrolytic cell representing one mode of the electrolytically oxidative purification of the present invention.

We explain in the pages that follow one mode of our invention according to FIG. 1:

A mixture of 25 grams of sodium chloride, 7 grams of sodium carbonate and 2 grams of sodium iodate dissolved in 1 liter of a photographic waste solution mixture (COD 87,000 ppm, pH 7.5); said mixture comprising an X-ray developer and fixing waste solution in the volume ratio of 1:1 thereof, is fed into a tank 4 through an inlet 1 and current is conducted through an electrolytic zone 2 composed of a platinum-plated titanium anode and an iron cathode. Electrolysis is performed at anode current densities of 10 A/dm$^2$ and current concentrations of 20 A/l. The gas generated in the electrolytic zone 2 lifts the electrolyte through an upstream pipe 3 to the tank 4; the electrolyte is then returned through a downstream pipe 5 to the electrolytic zone 2 repeating such circulation.

Figure 2:
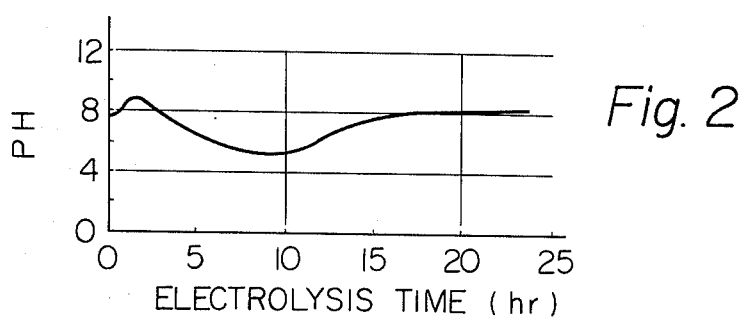
FIG. 2 is a pH-electrolysis time curve which shows pH changes in an electrolyte.

The gas separates from the electrolyte within the tank 4 and is discharged from an exhaust outlet 6. Immediately after current is conducted, the light brown electrolyte gradually turns darker brown, and some white substances are deposited therein, but thereafter, the formation of the deposition is gradually reduced and the color gradually fades away. The formation of some bubbles is observed immediately after the start of the electrolysis as well as in the middle phase of the electrolysis where the viscosity of the electrolyte increases, but after this phase the formation of bubbles comes to an end. During the course of electrolysis, the initial pH 7.5 of the electrolyte increases to about pH 9; subsequently it is gradually reduced, and about four hours after the start of the electrolysis the pH is again about 7.5. At this time the addition of 3N-an aqueous sodium hydroxide solution to the electrolyte through pipe 7 is begun at a rate of 15 ml per minute. Even the addition of said sodium hydroxide solution, the pH of the electrolyte is gradually reduced to about 5, but thereafter it increases. When the pH is about 8 (about 15 hours after the start of the electrolysis), the addition of the sodium hydroxide solution is discontinued. After that, the pH of the electrolyte remains nearly constant, (see FIG. 2). During the course of the electrolysis, the COD concentrations are linearly reduced. After 22 hours from the commencement of the electrolysis, the COD concentration becomes 15 ppm. Nothing floats on or slight precipitates in a semitransparent solution of the treated waste solution, which can be dumped into the water courses from an outlet 8. The precipitates are aluminum hydroxide derived from alum which the waste solution contains. If the waste solution does not contain alum, nothing precipitates. The electrolyte temperature and the cell operating voltage are maintained at 60° C and about 3.5 V, respectively, throughout the treatment.

The tank 4 to be used in the present invention may be cylindrical or prismatic, and may be composed of iron, stainless steel, heat-resistant plastics, porcelain and so on. It is equipped with an inlet 1 and an outlet 8 for electrolyte, pipe 7 for alkali addition and an outlet 6 for exhaust gas, and may optionally include cooling or stirring means.

The preferred anodes include such conductive and durable metal substrates as titanium, zirconium, and tantalum which are plated with platinum group metals or their alloys like platinum, palladium, rhodium, platinum-iridium, platinum-palladium, platinum-rhodium, and platinum-ruthenium, or if one does not care about some possible dissolving in the electrolyte, magnetite may be used as plating layer of the substrates. The above materials can be used alone. Lead dioxide or graphite should not be employed as the anode because they are rapidly consumed and produce low current efficiencies. As the cathode, iron, stainless steel and copper or the like can be used.

Before commencement of electrolysis, the pH of the photographic waste solution containing a fixing waste solution to be purified according to the present invention is adjusted to the range of 4 to 10. If the pH is below 4, a large quantity of sulfur is liberated by oxidation of the thiosulfate as a general fixing agent; also other problems arise, like corrosion of the cathode and cell or the generation of chlorine gas. On the other hand, if the pH is higher than 10, the increase in the viscosity of the electrolyte first retards the degradation of the waste solution, and second makes it very difficult to operate the process because the fluidity of the electrolyte is lessened and many bubbles are formed.

In recent years ammonium thiosulfate has been increasingly employed and, if the pH is above 10, it results in the generation of undesirable ammonia gas. When additives are added to the waste solution as mentioned below and are electrolysed, if the electrolyte has an initial pH of 4 to 8.5, the pH increases at once and then decreases. However, if the electrolyte has an initial pH of 8.5 to 10, the pH does not increase but gradually decreases. For a while after commencement of electrolysis, more white-colored precipitate generates on the acid side of pH of the waste solution than does on the alkali side, but immediately after commencement of electrolysis on the acid side of the electrolyte, it conveniently turns to alkali side whereupon the precipitation does not increase. When the pH reaches about 7.5 after commencement of electrolysis, the addition of alkali begins and the pH continues to go down gradually to about 5. After that the pH again increases gradually to about 8. The generation of the white precipitates immediately after commencement of electrolysis cannot be fully prevented, but by making the electrolyte acid side in the course of the electrolysis the majority of the precipitates can be dissolved. When the rate of the addition of alkali is too fast or the time of starting the addition of alkali is too early, the pH of the electrolyte is not proper, some precipitates remains in the treated waste solution and, further, the effect of the additives mentioned below is not satisfactory. In the final phase of electrolysis the pH of the electrolyte is about 8 and the concentration of COD components is reduced to about 10,000 ppm. Thereafter, the pH remains nearly constant and the treated waste solution can be discharged into the water courses.

The concentration, the quantity and the rate of alkali addition are determined by the proportion of fixing waste solution in the photographic waste solution, kinds of waste solution and current concentrations. The alkali is used in the form of an aqueous solution, thereby conveniently supplementing the water loss resulting from electrolytic decomposition and from evaporation during the electrolysis. The alkali to be used includes sodium hydroxide, potassium hydroxide and the like.

Even the adjustment of pH of the photographic waste solution containing a fixing waste solution does not satisfactorily solve the problems involved in applying non-diaphragm electrolytic oxidation to such solution; for one thing, it takes a long time to complete the electrolysis, and for another, electrolytic operation is difficult because bubbles which are formed during the procedure cause a loss of the electrolyte.

The conditions for avoiding such defects encountered in electrolytically oxidative process for purifying the photographic waste solution were enthusiastically studied by the present inventors, and they have at last discovered that the addition of suitable amounts of chloride and carbonate ions helps to reduce the electrolysis time remarkably, and that if these ions are combined with iodide or iodate ions the formation of said bubbles is not only checked but also a deodorizing effect is unexpectedly brought about. These ions may be originally contained in certain kinds of photographic waste solution, but as a rule they are not present in so great an amount as to enable the electrolytically oxidative process of our invention to be operated on a commercial scale. Another approach to the electrolytic treatment of an organic waste solution is envisaged by adding salt to the waste solution, but this technique is not operable for its deficiency in the effect.

According to the purification process of the present invention, about 5 to 60 grams of chloride ions are first made to be present in 1 liter of the photographic waste solution containing a fixing waste solution. The ions help form hypochlorite, thereby accelerating the degradation of the wastes and increasing the conductivity of the electrolyte. Such acceleration of degradation and reduction in the cell voltage would not be realized if the chloride ions were present in an amount of less than 5 grams per liter of the waste solution. On the other hand, the presence of more than 60 grams of the ion per liter of the waste solution is not desirable because the above-mentioned effects of the addition of the ion peak at this level. The chloride ions are added in the form of sodium chloride, potassium chloride and so on.

In the next step, about 5 to 30 grams of carbonate ion per liter of the waste solution are made to be present. By this addition, rapid acidifying of the waste solution is inhibited and the vigorous bubbling normally generated when the waste solution changes from the alkali side to acide side are prevented; further, degradation of the waste solution is accelerated to linearly proceed from the middle to the final phase of the electrolysis. In the electrolysis of waste solution containing ammonium thiosulfate without the presence of carbonate ions, some ammonia gas is generated in the pH range of 8.5 to 10, but by adding an appropriate amount of carbonate ions, the generation of ammonia gas is slowed to an extent so small as to be hardly detectable. The repressing of bubbling by acidifying the waste solution and reducing the ammonia gas generated does not result if the carbonate ions are present in an amount of less than 5 grams per liter of the waste solution. On the other hand, the presence of more than 30 grams of the ion per liter of the waste solution is not desirable, because the above-mentioned effects of the ion peak at this level and, if the initial pH of the electrolyte is higher than 10, some ammonia gas is generated. If the carbonate ions are present in the waste solution, particularly if the proportion of developer waste solution to fixing waste solution is large, the amount of carbonate ions added is made small and is adjusted to within the aforementiond range. Further, if the proportion of carbonate ions per liter of waste solution is more than 30 grams, excess carbonate ions are eliminated by using sodium oxalate, calcium chloride, barium chloride and so on. The carbonate ions are added in the form of sodium carbonate, potassium carbonate and the like.

Figure 3:
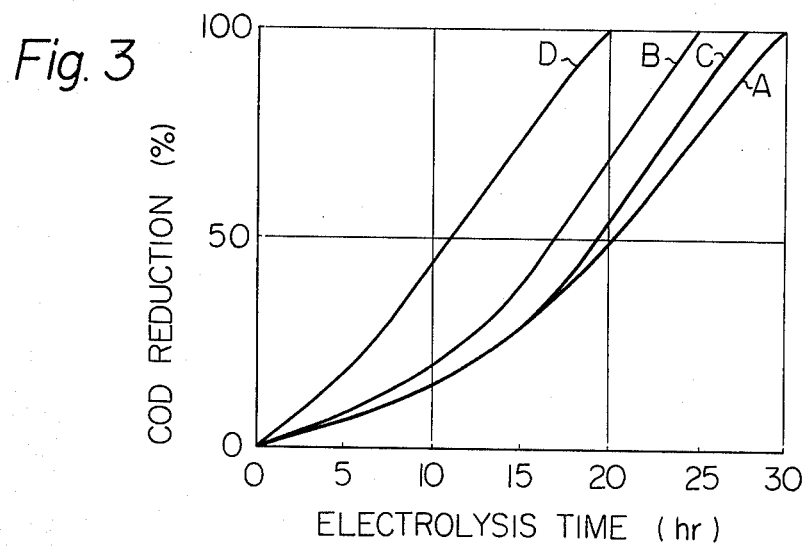
FIG. 3 is a COD reduction-electrolysis time curve which shows the effect on electrolysis of adding chloride ion and/or carbonate ion or further adding iodide or iodate ion into the waste solution from which the silver has been recovered.

As the third additive, about 0.08 to 9 grams of iodide or iodate ions per liter of waste solution are made to be present in the waste solution. The presence of the iodide or iodate ions almost completely represses the formation of bubbles generated in the course of the treatment. It also eliminates the odor which is often detected in the course of electrolysis or in the purified waste solution. Such effects would never be exhibited by the presence of less than 0.08 grams of the ion per liter of the waste solution whereas if present in an amount of more than 9 grams of the ion per liter of the waste solution, the rate of degradation slows down and the costs of the additives increase. The compounds which contain such ions are sodium iodide, potassium iodide, sodium iodate, potassium iodate, etc., all of which can be employed in the present invention. The combination of these three ions is preferable to the case where no ions are added or only chloride or carbonate ion is present in the waste solution because the frequency of troubles occurring in the course of electrolysis is low and more than 99.9% of COD reduction of the waste solution can be attained in a period of a third to a half the time required for the above shown cases. FIG. 3 visualizes the relation between the reduction of COD concentrations and the time course of electrolysis for each of the cases (A) where no ion-imparting precursors are added; (B) and (C) where 20 grams of sodium chloride per liter of the waste solution and an equal amount of sodium carbonate are added, respectively; and (D) where 10 grams each of sodium chloride and sodium carbonate and 2 grams of sodium iodide per liter of the waste solution are added. Other conditions for electrolysis for this Figure are in accordance with the aforementioned mode of our invention. The same curve as (D) is described when 10 grams of sodium chloride and an equal amount of sodium carbonate per liter of the waste solution are added but no sodium iodide is included.

The electrolytically oxidative process of the photographic waste solution according to the present invention is carried out at anode current densities in the range of from 2 to 40 A/dm$^2$. Below 2 A/dm$^2$, reaction proceeds at a slow rate and the cost of anode materials to be used is uneconomical. On the other hand, if the current density is greater than 40 A/dm$^2$, the life of the electrodes is remarkably reduced and power consumption increases because of high cell voltage. The preferred range of current densities is from 5 to 30 A/dm$^2$. The current concentration is selected at 3 to 50 A/l. A concentration below 3 A/l is not desirable because the reaction is slow and takes a long time, and bubbles are formed in the cell, the temperature of which does not rise so effectively, but on the other hand, if it is over 50 A/l the operation of the process as well as the designing of the cell becomes very difficult, for vigorous reaction causes many bubbles to be formed and large quantities of water are necessary to cool the electrolytic cell. The temperature of the electrolyte is raised by Joule's heat generated during the course of electrolysis and balanced by the current concentrations and room temperature. As a principle, cooling process is unnecessary unless excessive current concentrations are selected. The higher the temperature, the more accelerated is the degradation, but electrolysis can be performed at a temperature within the range of from 10° to 100° C. If the temperature is lower than 10° C, many disadvantages appear such as slow reaction, vigorous formation of bubbles, consumption of the anode and increase in the cell voltage; the selection of a temperature higher than 100° C also causes not a few defects, for example, high consumption of the anode, corrosion and deterioration of the apparatus as well as the emission of unpleasant odors. The preferred range of temperature is from 30° to 70° C. Since this range is maintained throughout the electrolysis if the current concentrations are at 3–20 A/l, cooling is not required to control it.

The purification process of the present invention is based on non-diaphragm electrolytic oxidation, but the reaction mechanism of the process has not yet been elucidated because of the technological immaturity of organic electrolysis and the great number of objectionable components included in the waste solution to be treated.

The stirring of the electrolyte in the process of purification according to the present invention cannot be dispensed with, and not only mechanical stirring using some power but also the lifting force of electrolysis-generated gas comprising hydrogen and oxygen are operable.

By applying the present invention's purification process to the photographic waste solution under the above prescribed conditions, the COD concentrations are reduced to almost zero nearly linearly thereby achieving the main purpose of the present invention; that is to say, the treated waste solution is an almost colorless transparent solution containing no precipitates or floating substances and it can be dumped in the water courses without applying secondary treatments. What is more, since the purification process of this invention produces nothing objectionable like chlorine gas during the course of electrolysis, it can be safely operated under natural exhaustion or ventilation alone. In this connection, either a batchwise or continuous operation will do in our process.

In accordance with the purification process of the present invention, high concentrations of COD levels involved in the photographic waste solution containing a fixing waste solution, which has been considered to be very difficult for the prior art techniques to purify sufficiently, are now reduced to almost zero rapidly, smoothly and at high efficiency, and the resulting purified solution can be discharged to the external environment without secondary treatment. The cost required for operating this process is extremely low: a half to a quarter of the cost incurred in the conventional "activated sludge" process or "thermal decomposition" method using hypochlorite as oxidizing agent, and about a third the cost necessary for effecting electrolysis with the addition of sodium chloride only. The time required for sufficiently removing the objectionable components from the waste solution in order to make it ecologically permissible is remarkably reduced to a half to a twentieth of that necessary in the conventional methods. Therefore, our process is very attractive from the standpoint of ease of operation and the great possibility of automatic control of our process in the future. Therefore, nobody will doubt that our purification process is sure to contribute in a great measure to the photographic field in solving environmental problems.

The following examples are given to further illustrate this invention, but it should be understood that the invention is by no way limited thereto. On the contrary, they are given only to clarify some of the essential working modes of the present invention.

EXAMPLE 1

A mixture of 40 grams of sodium chloride and 20 grams of sodium carbonate per liter of a waste solution was added to and dissolved in the mixed waste solution of color developer and bleach fixing in the volume ratio of 1:5. The resulting solution was fed into tank 4 of the electrolytic cell illustrated in FIG. 1. The electrolytic zone 2 consisted of the cathode, which was a flanged box type cell body made of stainless steel, and the anode, platinum-plated titanium, was fitted inside the cell body, and said zone was connected to the tank 4 with the downstream pipe 5 via the upstream pipe 3. The waste solution charged in this cell was subjected to electrolysis by conducting direct current at anode current density of 15 $A/dm^2$ and current concentration of 15 A/l. Soon after beginning electrolysis, the brown-colored electrolyte turned black; during the succeeding 8 hours the electrolyte gradually changed in color from black to yellow to milkwhite and after a total of 17 hours of the electrolysis a white semitransparent solution was obtained. During the course of the electrolysis, the initial pH 9 of the electrolyte is gradually reduced and about 3 hours after the start of the electrolysis the pH was 7.5. At this time the addition of 2.5N-sodium hydroxide solution to the electrolyte was begun at a rate of 20 ml per minute. Even during the addition, the pH continued to reduce gradually to 5, but thereafter it increased. About 17 hours after the start of the electrolysis, the pH became 7.9 and the addition of the sodium hydroxide solution was discontinued. From that time till the end of the electrolysis, the pH of the electrolyte remained nearly constant. The initial COD concentrations of 63,000 ppm almost linearly decreased with the time course of electrolysis and after 21 hours they were reduced to the COD concentrations of 45 ppm (reduction 99.9%), although in the final phase the rate of the decomposition of the electrolyte was somewhat slower. In the first phase and after the middle phase of the electrolysis, some bubbles were formed and a little deposition was formed on the cell wall when the electrolysis came to an end. Some odor was detected during the course of electrolysis and in the purified waste solution. The temperature of the cell remained at 22°–62° C throughout the operation and no cooling was required. The purified waste solution had a pH of 8.1 and contained no precipitate; it could be discharged in water courses without additional treatment. During the electrolysis, the cell voltage was maintained almost constant at the average of 3.4 V, consuming 1.9 KWh of power per liter of the waste solution. Further, during the course of electrolysis, there was no detectable generation of ammonia and chlorine, and sulfur odor was not detected.

EXAMPLE 2

Electrolysis was effected under the same conditions as in Example 1 adding not only sodium chloride and sodium carbonate but also 2 g of sodium iodide per liter of waste solution. The COD concentrations were reduced to 40 ppm in 21 hours. During the course of electrolysis, only a few bubbles and little odor were detected and no deposition was formed on the cell wall.

COMPARATIVE EXAMPLES 1 AND 2

Electrolysis was effected under the same conditions as in Examples 1 and 2 except for not adding alkali and not adjusting the pH in the course of electrolysis. About 3 to 4 hours after the commencement of the electrolysis, the pH in both cases was suddenly reduced and a few hours after that the pH was less than 1. During the course of these changes, a large quantity of gray-black precipitate was liberated and vigorous bobbling was observed, resulting in the electrolyte overflowing outside the cell, so it became impractical to proceed with the electrolysis.

COMPARATIVE EXAMPLE 3

Table 1 shows the results of the electrolysis performed under the same conditions as in the aforementioned one mode of the present invention except for adding either 10 grams of sodium chloride or an equal amount of sodium carbonate per liter of the waste solution comprising an X-ray developer waste solution and a fixing waste solution.

Table 1

| Add. per liter of waste solution | Time required for sufficient purification (hrs) | Bubbles | Deposition on cell wall | Ammonia odor |
|---|---|---|---|---|
| Nacl 10 grams | 25 | Many | Some | Strong |
| $Na_2co_3$ 10 grams | 27.5 | None | None | None |

EXAMPLE 3

A mixture of 25 grams of sodium chloride, 15 grams of sodium carbonate and 1 gram of potassium iodate per liter of a waste solution was added to and dissolved in the waste solution comprising a photoprinting plate developer waste solution and a fixing waste solution in the volume ratio of 1:1 thereof. The resulting solution was subjected to non-diaphragm electrolytic oxidation using the same electrolytic cell as in Example 1 at anode current density of 10 A/dm$^2$ and current concentration of 25 A/l. Soon after the initiation of the electrolysis, the pH of the electrolyte increased from 8.3 to 8.7 once, then gradually decreased, and about 4.5 hours after the start of the electrolysis the pH was 7.4. At this time, the addition of 2N-sodium hydroxide solution was begun to the electrolyte at a rate of 10 ml/minute. The pH continued to go down gradually to 4.7, then again gradually increased, and at that time the color gradually faded away. About 14.5 hours after the start of the electrolysis, the pH became 7.8 and the addition of alkali was discontinued. After that, the pH dropped once 7.5 and then rose to 8.0 at an end of the treatment. The initial COD concentration of 90,000 ppm almost linearly decreased with the time course of the electrolysis and after 22 hours they were reduced to the COD concentration of 60 ppm (reduction 99.9%). During the course of the electrolysis, few bubbles were observed and little odor was detected and the purified waste solution was a semi-muddy white. The temperature of the cell remained at 18°–60° C and some cooling was required. The average cell operating voltage was 3.6 V, and power consumption was 2.0 kWh per liter of the waste solution.

EXAMPLE 4

A mixture of 20 grams of sodium chloride, 5 grams of sodium carbonate and 2 grams of sodium iodate per liter of a waste solution was added to and dissolved in the waste solution comprising a X-ray developer waste solution and a fixing waste solution in the volume ratio of 4:1. The resulting solution was subjected to non-diaphragm electrolytic oxydation using the same electrolytic cell as in Example 1 except a platinum-iridium-plated titanium anode was used, at anode current density of 12 A/dm$^2$ and current concentration of 20 A/l. Soon after the commencement of the electrolysis, the pH of the electrolyte gradually decreased from 9.3 and after 3.5 hours became 7.6. At this time, the addition of 1N-sodium hydroxide solution was begun to the electrolyte at a ratio of 15 ml/minute. The pH continued to go down to 4.8, then gradually increased to 7.6 after 11.5 hours from the start of the electrolysis. At the time, the addition of the alkali was discontinued. When the treatment was finished, the pH was 8.3 and the color was almost clear light yellow. The initial COD concentration of 91,000 ppm was reduced to 75 ppm (reduction 99.9%) after 23 hours: at an end of the treatment. The temperature of the cell remained at 27°–68° C and no cooling was required. During the course of the electrolysis, few bubbles were observed and little odor was detected. The average cell operating voltage was 3.5 V and power consumption was 2.0 kWh per liter of the waste solution.

What we claim is:

1. In a process for electrolytically purifying a photographic waste solution containing a developer and a fixing waste solution, after silver has been recovered from said waste solution, the improvement which comprises adding to said waste solution about 5 to about 60 grams of chloride ion and about 5 to about 30 grams of carbonate ion per liter of said waste solution, and subjecting the resulting waste solution to non-diaphragm electrolytic oxidation at a pH of 4 to 10, a temperature of 10° to 100° C, an anode current density of 2 to 40 amperes per square decimeter and a current concentration of 3 to 50 amperes per liter.

2. A process as claim 1, wherein the temperature, the anode current density and the current concentration are in the range of 30° to 70° C, 5 to 30 amperes per square decimeter and 3 to 20 amperes per liter, respectively.

3. In a process for electrolytically purifying a photographic waste solution containing a developer and a fixing waste solution, after silver has been recovered from said waste solution, the improvement which comprises adding to said waste solution about 5 to about 60 grams of chloride ion, about 5 to about 30 grams of carbonate ion, and 0.08 to 9 grams of iodide or iodate ion per liter of said waste solution, and subjecting the resulting waste solution to non-diaphragm electrolytic oxidation at a pH of 4 to 10, a temperature of 10° to 100° C, and anode current density of 2 to 40 amperes per square decimeter and a current concentration of 3 to 50 amperes per liter.

4. A process as claim 3, wherein the temperature, the anode current density and the current concentration are in the range of 30° to 70° C, 5 to 30 amperes per square decimeter and 3 to 20 amperes per liter, respectively.

* * * * *